United States Patent [19]

Vollmer et al.

[11] 4,366,967
[45] Jan. 4, 1983

[54] COUPLING HOOK ASSEMBLY

[75] Inventors: Jürgen Vollmer, Lohmar; Norbert Müller, Ruppichteroth, both of Fed. Rep. of Germany

[73] Assignee: Jean Walterscheid GmbH, Lohmar, Fed. Rep. of Germany

[21] Appl. No.: 212,576

[22] Filed: Dec. 3, 1980

[30] Foreign Application Priority Data

Dec. 19, 1979 [DE] Fed. Rep. of Germany ....... 2951070

[51] Int. Cl.³ ............................................ A01B 59/042
[52] U.S. Cl. ..................................... 280/504; 172/272
[58] Field of Search ............... 280/504, 461 A, 460 A, 280/456 A; 172/272, 439

[56] References Cited

U.S. PATENT DOCUMENTS 3,404,901 10/1968 Rau ................................... 280/504 X
3,434,737 3/1969 Bailey et al. ..................... 280/504 X

FOREIGN PATENT DOCUMENTS 2618332 11/1977 Fed. Rep. of Germany ...... 172/439
2025748 1/1980 United Kingdom ................ 172/272

Primary Examiner—John A. Pekar
Attorney, Agent, or Firm—Toren, McGeady & Stanger

[57] ABSTRACT

A coupling hook assembly having a hook body defining an enclosed hook pocket with a locking bolt extending from a first aperture in the hook body into operative engagement with a hook jaw to lock and unlock an implement pin for joining a trailer with an agricultural tractor. The locking bolt is pivotally connected with an operating lever mounted on a fixed pivot within the hook body and extending through a second aperture therein. A yoke pivotally mounted on the operating lever is adapted to engage with a notch formed on the external surface of the hook body to secure the locking bolt in the locked position or into engagement with a recess in a part of the operating lever to secure the coupling hook assembly in the unlocked position.

3 Claims, 3 Drawing Figures

COUPLING HOOK ASSEMBLY

The present invention relates generally to trailer hitches and, more particularly, to a coupling hook assembly particularly adapted for use in attaching a trailer unit with an agricultural tractor.

The agricultural tractor with which the present invention may be utilized will involve a three-point attaching device having lower steering arms and the hook assembly of the invention operates to lock an implement pin forming part of the attachment or trailer unit within a jaw of the coupling hook by means of a spring-loaded locking bolt which extends through an aperture from a coupling hook pocket of the coupling hook assembly into operative engagement with the jaw to lock and unlock the implement pin. The locking bolt is articulated from within a hook body defining the pocket of the hook assembly and an operating lever is also pivotally mounted within the hook pocket at a fixed bearing point. The locking bolt partially projects from the hook body of the assembly through another aperture and the locking bolt is largely formed with a closed design.

In coupling hook assemblies of the type described, it is important that the coupling hook be protected against dirt, especially in the areas of the operating devices which act upon the bolting elements of the hook. Such a device is known from German Auslegeschrift No. 1 265 472. However, a disadvantage of such prior art devices is that in order to achieve a locked condition, two springs which are separated from each other are required. The spring acting upon the actual locking bolt in the direction of locking action may become effective only by operation of an unfavorable lever arm construction. Additionally, the force acting from the operating device through a so-called auxiliary rocking arm upon the locking bolt in the unlocking direction is so unfavorable that unlocking may not be possible if, for example, the coupling pin becomes jammed in the jaw of the coupling hook. This occurs because of the position of the points of articulation with respect to each other and with respect to the directions of forces involved.

An additional disadvantage may arise in that in the unlocked position, the slightest pressure exerted by the coupling pin against the auxiliary rocking arm of the device may cause the hook to become once again locked when uncoupling action is desired. This can only be undone by renewed pulling of an operating rope.

The forces of impact exerted by an attachment implement when the device must negotiate rough terrain and which necessarily act upon the locking unit partially in the direction of opening, will be transmitted by the auxiliary rocking arm to a pin arranged on the catch hook pocket of the coupling hook.

Accordingly, the present invention is directed toward providing a coupling hook assembly which may be protected against penetration of dirt and whose locking unit will consist merely of a small number of individual components which are movable relative to each other and which will permit automatic and subsequent locking with significant ease. The invention is directed toward providing a coupling hook assembly which, in special applications, will permit a positive arresting of the locking mechanism either in the open position or in the locked position.

SUMMARY OF THE INVENTION

Briefly, the present invention may be defined as a coupling hook assembly for use in an attaching device between an agricultural tractor and a trailer for locking an implement pin therein comprising a hook body defining an enclosed coupling hook pocket and a coupling hook jaw within which the implement pin may be received in locked engagement, means defining a first aperture in the hook body opening toward the jaw, a locking bolt adapted to extend through the first aperture into operative relationship with the jaw to effect locking of an implement pin therein and an operating lever mounted within the pocket for pivotal movement relative to the hook body about a fixed axis, the operating lever having the locking bolt pivotally mounted thereon. The locking bolt is spring-loaded in the locking direction of the hook assembly and the hook body is formed with a second aperture through which the operating lever may extend. An annular segment is formed on the operating lever having a curvature with a radius centered at the fixed pivoting axis of the operating lever and a yoke is pivotally mounted on a part of the operating lever which extends externally of the hook body. A recess is formed in the annular segment of the operating lever at a point thereof adapted to extend externally of the hook body and a notch is formed on the external surface of the hook body on a side of the second aperture closest to the jaw. The yoke may be pivoted into engagement with the recess in order to secure the locking bolt in the unlocked position. The yoke may also be pivoted to the opposite side of the operating lever into engagement with the notch formed on the hook body in order to lock the locking bolt in the locked position.

Furthermore, cam means may be provided on the operating lever within the pivoting range of the spring yoke.

A significant advantage arises in connection with the present invention inasmuch as the hook body is formed so that the operating elements of the device are maintained with a uniform degree of covering within the coupling hook pocket which is formed by the hook body. This uniform covering, which will prevent introduction of deleterious material, may be effected with the coupling hook assembly in the locked and in the unlocked position, as well as in all intermediate positions. The ability to arrest the locking device in the open position is of particular advantage in coupling and uncoupling operations because it releases the tractor driver from the obligation of continuously observing the condition of the coupling hook assembly during operation.

The additional positive locking effect of the coupling hook is particularly advantageous when the coupling hook is used at the front of a tractor is forestry applications, for example, when operating in areas having low-growing trees and bushes. As a result of the structural arrangement of the invention, the coupling hook cannot be unintentionally opened when the operating lever comes into contact with branches of such trees or bushes because of the covering effect which is provided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
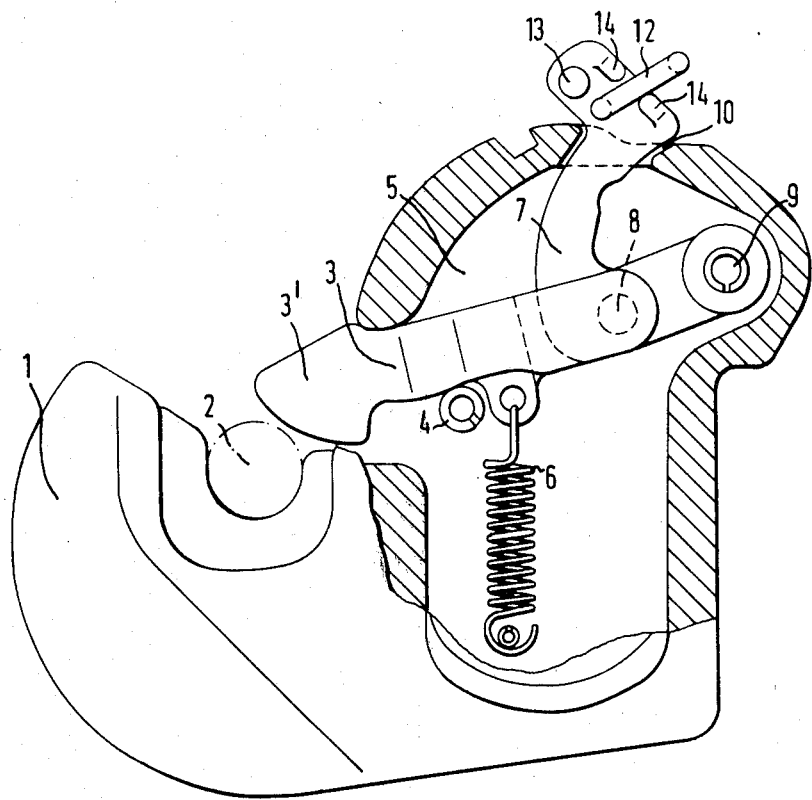
FIG. 1 is a sectional view showing the coupling hook assembly of the invention in the locked position.

Referring now to the drawings, the assembly of the invention is shown as comprising a coupling hook assembly including a coupling hook body 1 defining a jaw portion wherein an implement or coupling pin 2 may be engaged in locked position. The hook body is arranged to define an enclosed catch hook pocket 5 within which the operating components of the assembly are arranged. These operating components include a locking bolt 3 arranged to extend through a first aperture in the hook body 1 opening toward the jaw portion where the implement pin 2 is located. In order to lock the pin 2 in the jaw of the coupling hook, a locking dog 3' is formed on the locking bolt 3.

The assembly also includes an operating lever 7 which is mounted for pivotal movement about an axis fixed relative to the hook body 1 on a fixed bearing 9. The locking bolt 3 is pivotally mounted on the operating lever 7 by articulation means 8.

The operating lever 7 is formed to extend through a second aperture 10 formed in the hook body 1 and the general cross-sectional area of the aperture 10 is sized to coincide with the cross-section of the portion of the operating lever 7 extending therethrough.

A support bearing 4 affixed upon the hook body 1 is arranged within the catch hook pocket 5 and the locking bolt 3 is spring biased into the locking position against the support bearing by a closing spring 6.

The operating lever 7 is formed with an annular segment 16 having a recess 15 formed therein, the annular segment 16 having a radius of curvature which is centered at the fixed axis defined by the fixed bearing 9.

A spring yoke 12 is pivotally mounted upon the end of the operating lever 7 extending through the aperture 10 outwardly of the catch hook pocket 5, with the spring yoke 12 having a length defining a radius r determining the circular arc through which the outer end of the spring yoke 12 moves.

A notch or hook opening 11 is formed on the outer surface of the hook body 1 on a side of the aperture 10 closest to the jaw of the hook assembly where the implement pin 2 engages.

Figure 2:
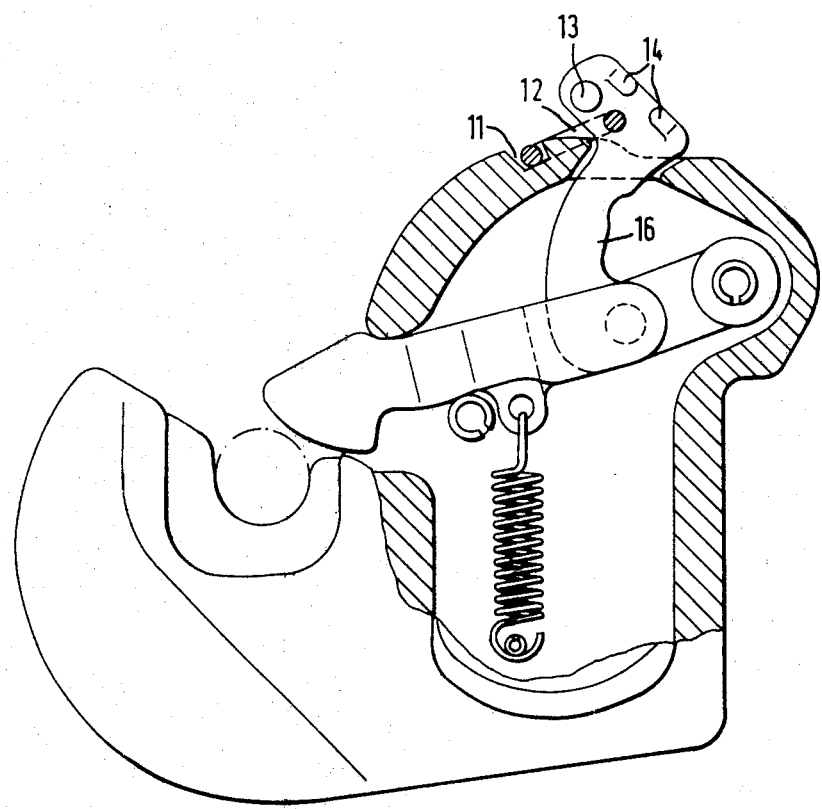
FIG. 2 is a sectional view of the coupling hook assembly in the locked position and secured against accidental opening.
Figure 3:
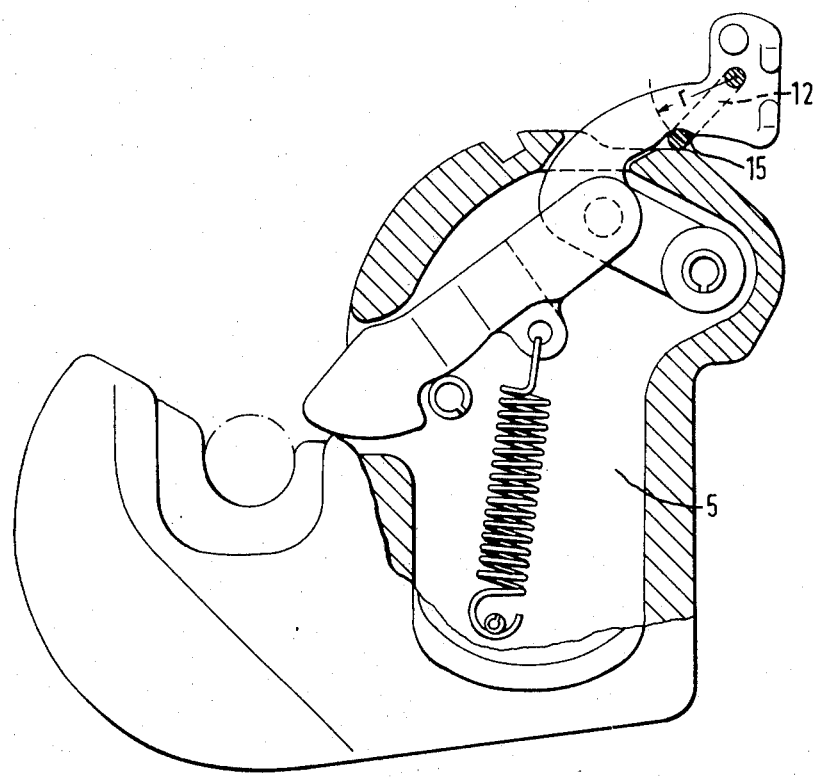
FIG. 3 is a sectional view of the assembly shown in the open position with the safeguard mechanism of the invention engaged to prevent accidental locking of the assembly.

An auxiliary bore 13 is formed at the end of the operating lever 7 to permit engagement of a traction rope (not shown) or other operative device whereby the coupling hook assembly may be locked from the driver's seat of the tractor The length r of the spring yoke 12 is such as to permit the free end of the spring yoke to be engaged within the recess 15 of the annular segment 16, as shown in FIG. 3, or to be engaged within the notch 11, as shown in FIG. 2.

As illustrated in FIG. 1, the locking bolt 3 is in the standard locked position. The locked position results from the fact that the locking dog 3' rests against the wall of the catch hook pocket 5 of the coupling hook with the locking bolt 3 resting against the supporting bearing 4. The method of securing a coupling pin in the coupling hook, as illustrated in FIG. 1, is sufficient for standard agricultural work. As previously indicated, the coupling hook may be locked from the driver's seat of the tractor by a traction rope (not shown) suspended either in the auxiliary bore 13 or in the spring yoke 12 by providing snap hooks. After releasing the traction rope, the locking bolt 3 automatically returns into the locked position.

For coupling an agricultural implement, all that needs to be done is to move the lower steering arms with the coupling hook 1 beneath the lower coupling pins 2 of the implement to be attached and then to raise the lower steering arms. Due to the coupling or implement pins 2 touching the locking dog 3', the coupling hook, as a result of a swiveling movement, is moved into the open position via the supporting bearing 4 after which it closes automatically after the coupling pin 2 has engaged into the hook jaw of the coupling hook.

FIG. 2 also shows a locked coupling hook where, however, in additon to the usual locking safeguard, the spring yoke 10 is suspended in the notch 11 arranged forwardly of the aperture 12 through which the operating lever 7 may be swiveled. This additional safeguard is of particular advantage if the tractor operates with an attached implement, for example, in the undergrowth of a forest, with such implement being attached either at the front or at the rear when reversing, because in such cases there is a risk of bushes or low branches touching the operating lever 7, thus releasing the locking mechanism. Of course, pivoting of the yoke 12 must be facilitated either by removing a traction rope or other implement attached in the bore 13 or by structuring the yoke 12 so that it may pivot clockwise from the position shown in FIG. 1 to that shown in FIG. 2.

In the case of the coupling hook illustrated in FIG. 3, the unlocked position is positively secured in the open position by engaging the spring yoke 12 in the recess 15 provided at the inner curve of the operating lever 7 in order to facilitate the coupling of an implement under difficult conditions.

Thus, it will be seen that when the hook assembly is in the position shown in FIG. 1, the spring 6 will draw the locking bolt 3 against the supporting bearing 4 and bring the locking dog 3' into engagement with the implement pin 2 to lock the implement pin 2 in place. In the position shown in FIG. 1, the spring yoke 12 is not engaged in the notch 11 and the assembly is not positively held in the locked position shown in FIG. 1. Thus, by rotating the operating lever 7 clockwise about the fixed bearing 9, the locking bolt 3 may be drawn upwardly and inwardly within the catch hook pocket 5 against the force of the spring 6 into the open position shown in FIG. 3.

With the assembly in the open position, the spring yoke 12 may be rotated, as shown in FIG. 3, into engagement within the recess 15 whereby the assembly will be secured in the open position.

With the assembly in the locked position shown in FIG. 1, if the spring yoke 12 is rotated so that the free end thereof comes into engagement with the notch 11, then the assembly will be secured in the locked position.

It should be noted that the hook body 1 forms the catch hook pocket 5 essentially as an enclosed chamber whereby dirt or other deleterious materials may be prevented from entering and whereby undesired actuation of the operating levers, by branches or other similar elements, may be avoided. Thus, unintentional locking or unlocking of the assembly will be more effectively prevented.

It should further be noted that, in accordance with another aspect of the invention, the operating lever 7 may be provided with detent means 14 in the swiveling range of the spring yoke 12.

Providing at least one or even two detent members 14 has the advantage that the spring yoke at the operating lever, via the detent means, can be swiveled into a preferential position favorable for the type of work carried out or, if there are two detent members, it can be placed into a neutral position therebetween.

While specific embodiments of the invention have been shown and described in detail to illustrate the application of the inventive principles, it will be understood that the invention may be embodied otherwise without departing from such principles.

What is claimed is:

1. A coupling hook assembly for use in an attaching device between an agricultural tractor and a trailer for locking an implement pin therein comprising: a hook body defining an enclosed coupling hook pocket and a jaw within which said implement pin may be received in locked engagement; means defining a first aperture in said hook body opening toward said jaw; a locking bolt adapted to extend through said first aperture in operative relationship with said jaw to effect locking of an implement pin therein; an operating lever mounted within said pocket for pivotal movement relative to said hook body about a fixed axis; means pivotally mounting said locking bolt on said operating lever; spring means urging said locking bolt toward a locking position relative to said jaw; means defining in said hook body a second aperture having said operating lever extending therethrough; an annular segment formed in said operating lever having a curvature with a radius centered at said fixed pivoting axis of said operating lever; a recess formed in said annular segment of said operating lever at a point thereon adapted to be brought externally of said hook body by pivotal movement of said operating lever about said fixed axis; a notch formed on the external surface of said hook body on the side of said second aperture closest to said jaw; and a yoke pivotally mounted on a part of said operating lever located externally of said hook body, said yoke being adapted to be swung into engagement with either said recess, to secure said locking bolt in the unlocked position, or with said notch, to secure said locking bolt in the locked position.

2. An assembly according to claim 1 wherein said second aperture is formed with a cross-sectional dimension generally corresponding to the cross-sectional dimension of the portion of said operating lever extending therethrough.

3. An assembly according to claim 1 further comprising detent means located on said operating lever within the range of motion of said pivoted yoke to retain said pivoted yoke in a given position.

* * * * *